J. E. OSMER.
BRAKE SHOE.
APPLICATION FILED AUG. 18, 1909.
945,409.
Patented Jan. 4, 1910.
2 SHEETS—SHEET 1.
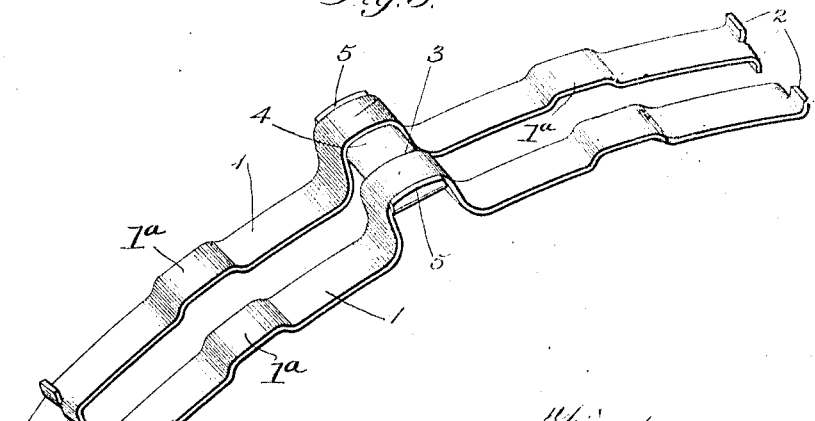
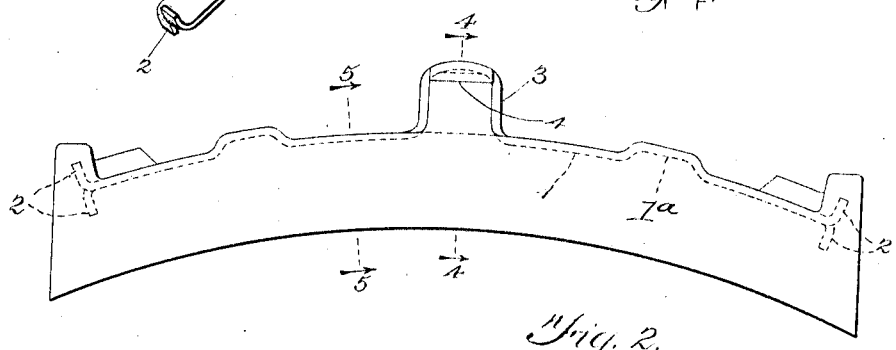
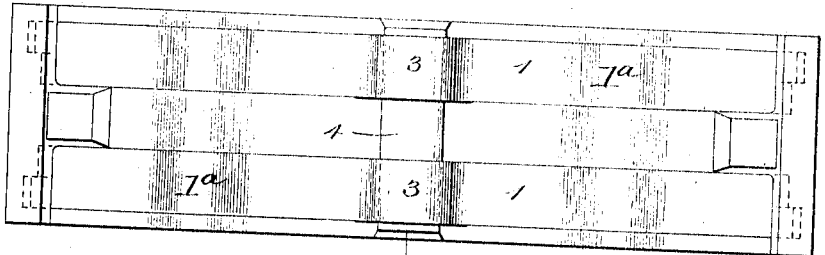
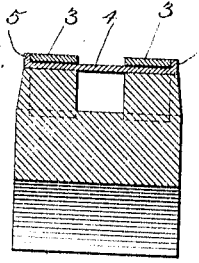
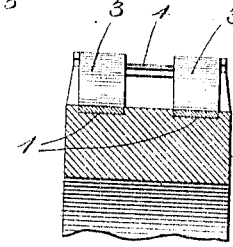
Witnesses:
J. C. Devick
George Chindahl
Inventor:
John E. Osmer
By Luther L. Miller
Attorney

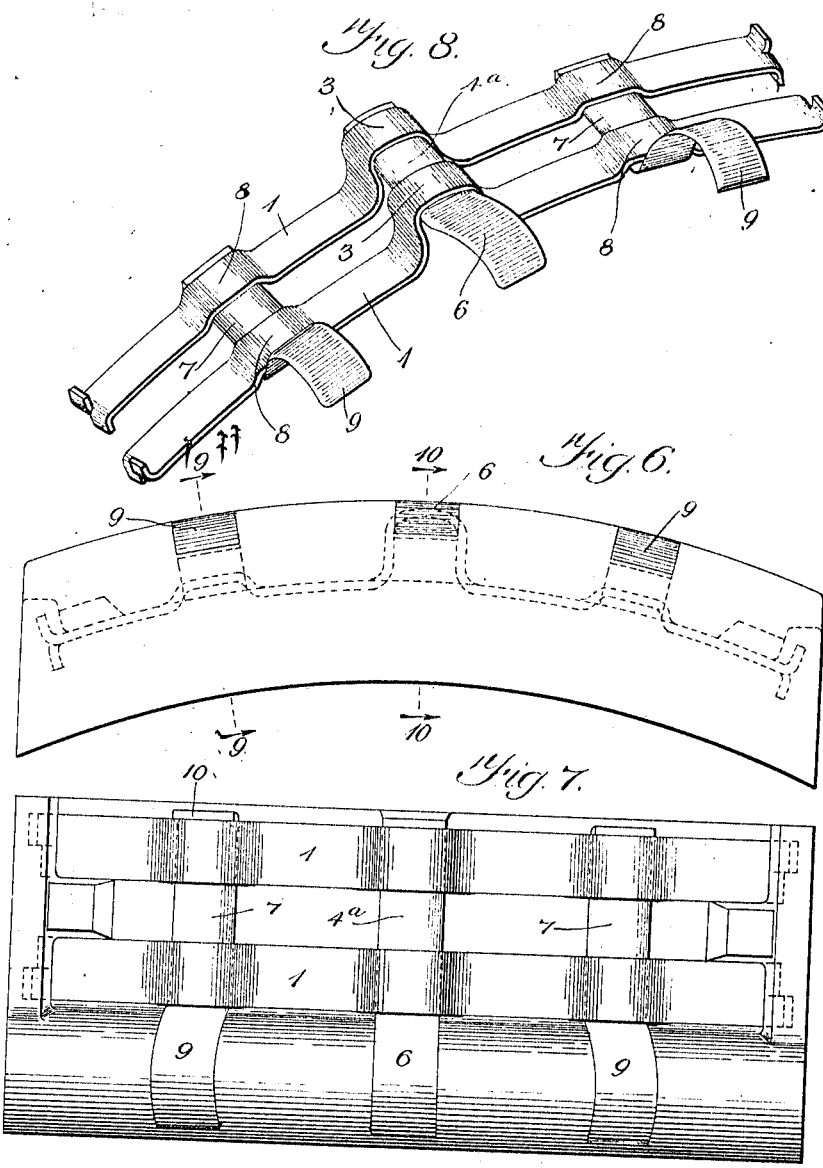

UNITED STATES PATENT OFFICE.

JOHN E. OSMER, OF CHICAGO, ILLINOIS.

BRAKE-SHOE.

945,409.  Specification of Letters Patent.  Patented Jan. 4, 1910.

Application filed August 18, 1909. Serial No. 513,376.

*To all whom it may concern:*

Be it known that I, JOHN E. OSMER, a citizen of the United States, residing at Chicago, in the county of Cook and State of Illinois, have invented certain new and useful Improvements in Brake-Shoes, of which the following is a specification.

This invention relates to brake shoes of the type wherein the cast-metal body is provided with a reinforcing of steel, wrought iron, or other suitable material.

One of the objects of the invention is to provide a reinforcing of such form as will obviate the necessity for cutting or punching the reinforcing at or near the attaching lug, such cutting or punching having a tendency to cause incipient fractures and thus weaken the reinforcing.

Another object of the invention is to provide improved reinforcing for a flange brake shoe.

The invention also relates to the other features of improvement in brake shoes, herein set forth.

In the accompanying drawings Figure 1 is an edge view of a brake shoe embodying the features of my invention. Fig. 2 is a rear side view of said shoe. Fig. 3 is a perspective view of the reinforcing for said shoe. Figs. 4 and 5 are sections on lines 4 4 and 5 5, respectively of Fig. 1. Fig. 6 is an edge view of a flange brake shoe embodying my invention. Fig. 7 is a rear side view of said shoe. Fig. 8 is a perspective view of the reinforcing for said shoe. Figs. 9 and 10 are transverse sectional views taken in the planes of dotted lines 9 9 and 10 10, respectively, of Fig. 6.

The shoe illustrated in Figs. 1 and 2 is provided with metallic members embedded in the body of the shoe and the attaching lug during the casting operation for the purpose of reinforcing the body and said lug, and in order to hold the parts together in case the cast-metal body should break. In the form herein shown, said reinforcing members consist of two substantially similar strips 1 extending longitudinally of the shoe and in substantially parallel relation with each other, and embedded in the cast metal at or near the rear side of the shoe. Upon the ends of the members 1 may be formed angular lugs which are embedded in the cast-metal, and which serve to secure together the reinforcing and the cast-metal. In the members 1 are formed shallow bends 1ª into which the gray iron flows during the casting operation, and which serve to further secure together the reinforcing and the cast metal. It will be seen that these bends tend to prevent movement of a broken fragment of the cast body longitudinally of the members 1.

The members 1 may be formed of steel, commercial band iron, or other suitable material. The middle portions of the members 1 are bent to form outwardly extending loops 3. A cross-bar 4 of steel, iron, or other suitable material extends transversely of the loops 3 and lies within said loops, the ends 5 of the cross-bar being bent to lie at the outer sides of the loops. The loops 3 and the portions of the bar 4 lying immediately below said loops are embedded in the cast metal forming the attaching lug, the space between said loops and below the middle of the cross-bar 4 being left open, as shown in Fig. 4, to receive the key by means of which the shoe is attached to the brake head. It will be seen that the construction just described provides a very strong attaching lug. The members 1 1 and 4 have no openings punched therethrough, but, on the contrary, are bent into proper shape effectively to reinforce the attaching lug.

In the flange shoe shown in Figs. 6 and 7 the reinforcing members 1 are substantially similar to those shown in Figs. 1, 2 and 3. In order to strengthen the flange portion of the shoe body the cross-bar 4ª is provided at one end with a bent portion 6 of suitable size and curvature for embedment in the flange portion of the shoe at or near the rear side of said flange portion. The portions of the flange at either side of the attaching lug are reinforced by a suitable number of cross-bars 7 lying in shallow bends 8 in the members 1 and having at one end extensions 9 of suitable size and curvature to lie within the flange portion. The ends of the bars 4ª and 7 opposite to the curved portions 6 and 9 have terminal flanges 10.

In making the shoes herein shown, the reinforcing members are preferably coated with a flux which causes them to unite with the cast metal. Preferably the loops 3 are not submerged in the cast metal, as such submergence tends to crystallize the metal of the loops, thus weakening the lug.

It will be seen that the reinforcing herein described is very simple, may be readily formed from commercial band iron or other relatively inexpensive material, and efficiently reinforces the body of the shoe and its flange and attaching lug.

I claim as my invention:—

1. A brake shoe having embedded therein two longitudinally extending reinforcing members, the middle portions of said members being bent to provide loops which are embedded in the attaching lug of the shoe, and a transversely extending reinforcing member lying within the outer portions of said loops, the ends of said transversely extending member being bent to lie at the outer sides of said loops to prevent said transversely extending member from being pulled out of the attaching lug.

2. A brake shoe having embedded therein two longitudinally extending parallel reinforcing strips, the middle portions of said strips being bent to provide outwardly extending loops which are embedded in the attaching lug of the shoe, and a transversely extending straight reinforcing bar lying within said loops, the end portions of said bar being embedded in the cast metal, an open space being provided beneath the middle portion of said bar for the reception of a key, the ends of said transversely extending bar being bent to lie at the outer sides of said loops to prevent said transversely extending bar from being pulled out of the attaching lug.

3. A flange brake shoe having embedded therein two longitudinally extending reinforcing members, the middle portions of said members being bent to provide loops which are embedded in the attaching lug of the shoe, and a transverse reinforcing member lying within said loop and partially embedded in the cast metal, said transversely extending member having at one end a curved extension which is embedded within and reinforces the flange portion of the shoe.

4. A flange brake shoe having embedded therein two longitudinally extending reinforcing members, the middle portions of said members being bent to provide loops which are embedded in the attaching lug of the shoe, a transverse reinforcing member lying within said loop, and partially embedded in the cast metal, said transversely extending member having at one end a curved extension which is embedded within and reinforces the flange portion of the shoe, and a plurality of transverse members lying within bends formed in said longitudinally extending members, the last mentioned transversely extending members having at one end curved extensions which are embedded within and reinforce the flange portion of the shoe.

5. A flange brake shoe having embedded therein two longitudinally extending reinforcing strips, the middle portions of said members being bent to provide outwardly extending loops which are embedded in the attaching lug of the shoe, a transverse reinforcing bar lying within said loops and embedded in the cast metal, said transversely extending bar having at one end a curved extension which is embedded within and reinforces the flange portion of the shoe, and a plurality of transverse bars lying within shallow bends formed in said longitudinally extending strips and having at one end curved extensions which are embedded within and reinforce the flange portion of the shoe.

6. A brake shoe having embedded therein two longitudinally extending reinforcing strips, the middle portions of said strips being bent to provide outwardly extending loops which are embedded in the attaching lug of the shoe, and a transversely extending reinforcing member lying within the outer portions of said loops, said strips being bent at points intermediate their ends and said loops, to form shallow recesses which are filled with the cast metal of the shoe.

JOHN E. OSMER.

Witnesses:
J. RAYMOND BARSE,
GEORGE L. CHINDAHL.